United States Patent Office 3,528,977
Patented Sept. 15, 1970

3,528,977
SUBSTITUTED t-AMINOPHENYLALANINES
Richard A. Schnettler, Milwaukee, Wis., assignor to Colgate-Palmolive Company, New York, N.Y., a corporation of Delaware
No Drawing. Filed Dec. 14, 1966, Ser. No. 601,547
Int. Cl. C07d 87/36
U.S. Cl. 260—247.2                                    5 Claims

ABSTRACT OF THE DISCLOSURE

The compounds are substituted t-aminophenylalanines useful as antihypertensive agents and chelating agents for heavy metal ions. A compound disclosed is diethyl α-morpholino-α-(3,4-dibenzyloxybenzyl)malonate.

The present invention relates to novel substituted t-aminophenylalanines, methods of preparing such compounds, pharmaceutical compositions containing them and therapeutic methods employing them.

The novel compositions of the present invention may be represented by the following formula:

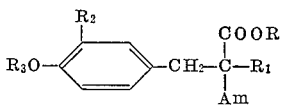

wherein R is selected from hydrogen and a lower alkyl containing 1 to 4 carbon atoms, $R_1$ is hydrogen or COOR $R_2$ is selected from hydrogen, hydroxy, lower alkoxy such as methoxy, ethoxy and butoxy, and aralkoxy such as benzyloxy, phenylethoxy and the like, $R_3$ may be hydrogen, a lower alkyl of 1 to 4 carbon atoms, an aralkyl of 7 to 11 carbon atoms inclusive, such as benzyl, phenylethyl, phenylisopropyl and phenylbutyl, and Am is a cyclic amine group such as morpholino, pyrrolidino, piperidino, 4-lower alkyl-piperazino such as 4-methyl-1-piperazino, 3-hydroxypiperidino and 4-hydroxypiperidino; however, when Am is morpholino $R_2$ and $R_3$ cannot both be hydrogen.

A convenient starting material for the preparation of the compounds of the present invention are the substituted benzyl halides of the following formula:

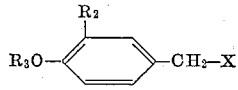

in which X is a reactive halide and $R_2$ and $R_3$ are as defined.

Representative of the benzyl halides which may be employed are the following known compounds:

p-Benzyloxybenzyl chloride, and
3,4-benzyloxybenzyl chloride.

In the preferred preparation of the compounds of the present invention, the desired benzyl halide is treated with a suitable heterocyclic amino malonic acid ester, in the presence of a condensing agent such as sodium hydride, sodium methoxide or sodium ethoxide. The ester which forms may then be hydrolyzed by conventional techniques to obtain the novel amino acids.

The described process may be illustrated as follows:

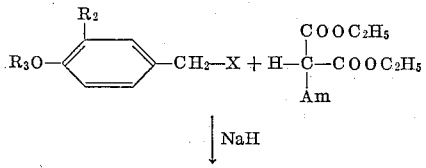

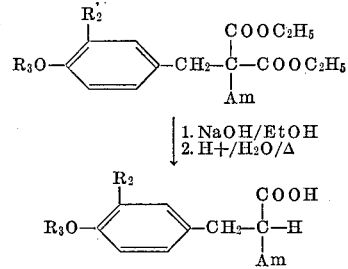

in which all symbols are as described.

The compounds in which $R_3$ is hydrogen and $R_2$ is hydrogen or hydroxy may be prepared by treating the corresponding compounds in which $R_3$ is benzyl and $R_2$ is hydrogen or benzyloxy with hydrogen in the presence of a suitable catalyst such as palladium on carbon.

The described process may be illustrated as follows:

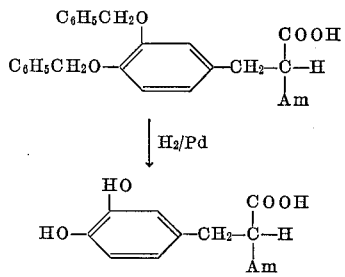

wherein Am is as previously defined.

Among the heterocyclic amine which can be reacted with the previously described benzyl halides in the previously described process are the following:

diethyl morpholinomalonate,
diethyl pyrrolidinomalonate,
diethyl N-methyl-N'-piperazine malonate,
ethyl morpholinoacetate,
diethyl 3-hydroxypiperidinomalonate, and
diethyl N-butyl-N'-piperazine malonate.

Representative of the novel compounds which may be prepared by the described process are the following:

diethyl-α-morpholino-α-(p-benzyloxybenzyl)malonate,
α-morpholino-β-p-benzyloxyphenyl propionic acid,
α-morpholino-β-(p-benzyloxyphenyl)-propionic acid,
α-morpholino-β-(3,4-dihydroxyphenyl)-propionic acid,
α-pyrrolidino-β-(3,4-dihydroxyphenyl)-propionic acid,
diethyl α - (N-methyl-N'-piperazine)-α-(p-benzyloxybenzyl)malonate,
α - (N - methyl - N'-piperazine)-β-(p-benzyloxyphenyl)-propionic acid,
diethyl α-morpholino-α-(3,4-dibenzyloxybenzyl)malonate,
diethyl α-pyrrolidino-α-(3,4-dibenzyloxybenzyl)malonate,
α-morpholino-β-(3,4-dibenzyloxyphenyl)-propionic acid,
α-pyrrolidino-β-(3,4-dibenzyloxyphenyl)-propionic acid,
α - (N - methyl-N' - piperazine) - β - (p-hydroxyphenyl)-propionic acid,
diethyl α - (N - methyl-N'-piperazine)-α-(3,4-dibenzyloxybenzyl)malonate,
diethyl α - (3 - hydroxypiperidine)-α-(3,4-dibenzyloxybenzyl)malonate,
α - (N - methyl - N'-piperazine)-β-(3,4-dibenzyloxyphenyl)-propionic acid,
α - (3 - hydroxypiperidine) - β - (3,4 - dibenzyloxyphenyl)-propionic acid,
α-(N-methyl - N' - piperazine) - β - (3,4-dihydroxyphenyl-propionic acid,
α - (3 - hydroxypiperidine) - β - (3,4 - dihydroxyphenyl-propionic acid, and
diethyl α-morpholino-α-(3,4-dihydroxybenzyl)malonate.

Acid addition salts of the compounds of the present invention which are capable of forming such salts may be conveniently produced by contacting the compounds with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the compounds with a suitable alkylating agent such as dimethyl sulfate, or an alkyl halide such as methyl chloride, methyle iodide or ethyl bromide.

The novel amino acids of the present invention and their pharmaceutically acceptable salts have utility as antihypertensive, antianginal, and psychopharmacologic agents. In addition, these compounds are useful as chelating agents for heavy metal ions and as intermediates in the preparation of more complex pharmaceutical and chemical compounds.

When intended for pharmaceutical use, the compounds are preferably combined with one or more suitable pharmaceutical diluents and additives and formed into unit dosage forms for oral or parenteral administration such as tablets, capsules and solutions.

The pharmaceutical diluents which may be employed may be either solids such as starch, talc or sugar, or liquids such as water or a suitable organic solvent.

The unit dosage forms may contain a concentration of 0.1% to 10% or more by weight of one or more of the novel compounds. Generally, such dosage forms will contain about 5 to 150 mg. of the active ingredients.

The following examples are presented to illustrate this invention:

EXAMPLE 1

Diethyl α-morpholino-α-(p-benzyloxybenzyl)malonate

To 300 ml. of dry toluene is added 1.1 g. (0.049 mole) sodium hydride and 6.65 g. (0.027 mole) diethyl morpholino-malonate. The mixture is stirred at room temperature for ½ hour after which 6.30 g. (0.027 mole) p-benzyloxybenzyl chloride is added dropwise in 100 ml. toluene over a period of ½ hour. The mixture is then stirred at reflux for 5 hours, cooled and water is added slowly to decompose the excess sodium hydride. The organic layer is separated from the aqueous, washed with water and extracted with 6 N hydrochloric acid, made basic with sodium hydroxide solution (20%) and extracted into ethyl acetate. The ethyl acetate extract is washed with water, dried and solvent removed to give an oil which crystallized from petroleum ether to give diethyl α-morpholino-α-(p-benzyloxybenzyl)malonate in the form of colorless crystals; M.P. 83–84°.

*Analysis.*—Calcd. for $C_{25}H_{31}NO$ (percent): C, 68.01; H, 7.08; N, 3.17. Found (percent): C, 68.42; H, 6.95; N, 3.45.

EXAMPLE 2

α-Morpholino-β-p-benzyloxyphenyl propionic acid

To 100 ml. ethanol and 3.0 g. sodium hydroxide is added 2.50 g. (0.0073 mole) diethyl α-morpholino-α-(p-benzyloxybenzyl)malonate. The mixture is heated on a steam bath for 2 hours, cooled and diluted with 100 ml. water. The solution is acidified with dilute hydrochloric acid until the mixture is neutral to pH paper. The heavy white precipitate which forms is collected on a filter to give α-morpholino-β-p-benzyloxyphenyl propionic acid in the form of a white solid; M.P. 210–218°.

*Analysis.*—Calcd. for $C_{20}H_{23}NO_4$ (percent): C, 70.36; H, 6.79; N, 4.10. Found (percent): C, 70.39; H, 6.82; N, 4.03.

EXAMPLE 3

α-Morpholino-β-(p-hydroxyphenyl)-propionic acid

To 75 ml. 5% hydrochloric acid is added 6.13 g. (18.2 moles) α-morpholino-β-(p-benzyloxyphenyl)-propionic acid and 1.0 g. 10% palladium-charcoal. The mixture is shaken with hydrogen (30 p.s.i.) for 2 hours, filtered and adjusted to pH 7 with 10% sodium hydroxide. Upon cooling of the mixture α-morpholino-β-p-hydroxyphenyl-propionic acid in the form of a white solid is obtained; M.P. 310–320°.

*Analysis.*—Calcd. for $C_{13}H_{17}NO_4$ (percent): C, 62.14; H, 6.82; N, 5.58. Found (percent): C, 62.29; H, 6.83; N, 5.04.

EXAMPLE 4

α-Morpholino-β-(3,4-dihydroxyphenyl)-propionic acid

To 50 ml. 5% hydrochloric acid is added 1.0 g. (2.24 moles) α-morpholino-β-(3,4-dibenzyloxyphenyl)-propionic acid and 1.0 g. 10% palladium-charcoal. The mixture is shaken with hydrogen (40 p.s.i.) for 22 hours, filtered and the excess water removed by azeotropic distillation with toluene. A brown solid is obtained which is washed with butanol and ether to give α-morpholino-β-(3,4-dihydroxyphenyl)-propionic acid in the form of a white solid; M.P. 275–279°.

*Analysis.*—Calcd. for $C_{13}H_{17}NO_5$ (percent): C, 58.42; H, 6.41; N, 5.24. Found (percent): C, 57.88; H, 6.31; N, 5.13.

EXAMPLE 5

Diethyl α-(N-methyl-N'-piperazine)-α-(p-benzyloxybenzyl)malonate

To 250 ml. toluene is added 10.0 g. (0.00387 mole) diethyl N-methyl-N'-piperazine malonate and 4.1 g. (0.01 mole) 59% sodium hydride. The mixture is stirred at room temperature for ½ hour after which 9.0 g. (0.00387 mole) p-benzyloxybenzyl chloride is slowly added as a dry solid. The mixture is heated to reflux for 4 hours, cooled and water slowly added to decompose the sodium hydride. The system is washed with water followed by washing with 15% hydrochloric acid. A layer of the hydrochloride salt (oily) formed and is collected to give, after neutralization, diethyl α-(N-methyl-N'-piperazine)-α-(p-benzyloxybenzyl)malonate.

*Analysis.*—Calcd. for $C_{23}H_{34}N_2O_5$ (percent): C, 68.70; H, 7.54; N, 6.16. Found (percent): C, 68.79; H, 7.72; N, 6.16.

EXAMPLE 6

α-(N-methyl-N'-piperazine)-β-(p-benzyloxyphenyl)-propionic acid

To 50 ml. ethanol is added 9.0 g. (0.198 mole) diethyl α-(N-methyl-N'-piperazine)-α-(p-benzyloxybenzyl) malonate and 7.1 g. sodium hydroxide. The mixture is heated for 2 hours on the steam bath, cooled and the solvent removed to give a pasty mass. This is dissolved in dilute hydrochloric acid and the water removed by azeotropic distillation with toluene. The residue is dissolved in ethanol and filtered. Removal of solvent yields α-(N-methyl-N'-piperazine)-β-(p-benzyloxyphenyl) - propionic acid in the form of a white solid; M.P. 202–204°.

*Analysis.*—Calcd. for $C_{21}H_{26}N_2O_3$ (percent): C, 71.16; H, 7.39; N, 7.90. Found (percent): C, 70.95; H, 7.59; N, 7.95.

EXAMPLE 7

Diethyl α-morpholino-α-(3,4-dibenzyloxybenzyl) malonate

To 100 ml. ether is added 20.0 g. (0.06 mole) 3,4-dibenzyloxybenzyl alcohol and 20 g. thionyl chloride. The mixture is stirred at room temperature for one hour and then heated to boiling with 100 ml. toluene. The toluene is allowed to distill until it is neutral to pH paper.

To 300 ml. dry toluene is added 15.3 g. (0.06 mole) diethyl α-morpholinomalonate and 2.4 g. (0.1 mole) sodium hydride. The mixture is stirred at room temperature for ½ hour after which the above toluene solution of the benzyl halide is added dropwise over a period of ½ hour. The mixture is stirred at reflux for 20 hours, cooled and water added to destroy excess sodium hydride.

The toluene solution is washed with water and then shaken with 6 N HCl. At this point three layers appear in the separatory funnel of which the oil between the toluene and aqueous phase is collected. This is repeated until no more oil separates. To the oil is added ethyl acetate and 10% sodium hydroxide solution (100 ml.). The ethyl acetate solution is washed with water and dried. Removal of the solvent yields diethyl α-morpholino-α-(3,4-dibenzyloxybenzyl)malonate in the form of a brown oil. Chromatography of this oil provides a light yellow oil which does not crystallize.

*Analysis.*—Calcd. for $C_{32}H_{37}NO_7$ (percent): C, 70.18; H, 6.81; N, 2.56. Found (percent): C, 71.93; H, 6.82; N, 2.54.

EXAMPLE 8

α-Morpholino-β-(3,4-dibenzyloxyphenyl)-propionic acid

To 200 ml. ethanol is added 9.1 g. (0.0166 mole) of the compound of Example 7 and 4.0 g. (0.1 mole) sodium hydroxide. The mixture is heated on the steam bath for 2 hours, cooled and diluted with 200 ml. water and filtered. Hydrochloric acid (10%) is added until the system is neutral. A heavy white precipitate forms and is collected on the filter and recrystallized from CHCl₃: petroleum ether to give α - morpholino-β-(3,4-dibenzyloxyphenyl)-propionic acid in the form of a white solid; M.P. 169–171°.

*Analysis.*—Calcd. for $C_{27}H_{29}NO_5$ (percent): C, 72.46; H, 6.53; N, 3.13. Found (percent): C, 72.63; H, 6.58; N, 3.41.

EXAMPLE 9

α-(N-methyl-N′-piperazine)-β-(p-hydroxyphenyl)-propionic acid dihydrochloride

To 50 ml. 5% hydrochloric acid is added 2.0 g. (5.65 moles) α-(N-methyl-N′-piperazine) - β - (p-benzyloxyphenyl)-propionic acid and 1.0 g. 10% palladium-charcoal. The mixture is shaken with hydrogen (40 p.s.i.) for 1.75 hours, filtered and the excess water removed by azeotropic distillation with toluene. The yellow residue is washed with ethanol and ether to give α-(N-methyl-N′-piperazine)-β-(p-hydroxyphenyl)-propionic acid dihydrochloride in the form of a white solid; M.P. 230–235°.

*Analysis.*—Calcd. for $C_{14}H_{22}N_2O_3Cl_2$ (percent): C, 49.85; H, 6.58; N, 8.31. Found (percent): C, 50.51; H, 6.74; N, 8.32.

EXAMPLE 10

Diethyl α-(N-methyl-N′-piperazine)-α-(3,4-dibenzyloxybenzyl)malonate 3,4-dibenzyloxybenzyl alcohol (16.0 g., 0.05 mole) is allowed to react with 7.1 g. (0.06 mole) of thionyl chloride in 200 ml. ether under reflux for 1 hour. The ether and excess thionyl chloride are distilled from the mixture with the aid of toluene.

To 200 ml. dry toluene is added 8.3 g. (0.032 mole) diethyl (N-methyl-N′-piperazine)malonate and 1.20 g. (0.05 mole) sodium hydride. The mixture is allowed to stir for 30 minutes after which the benzyl halide is added as a toluene solution (100 ml.) dropwise. The mixture is stirred at reflux for 4 hours, cooled and water (100 ml.) added to destroy the excess sodium hydride. The toluene layer is washed with 500 ml. water, dried and solvent removed to give the ester. An analytical sample is prepared by chromatography over silica gel (chloroform:EtOAc, 40:1) to given diethyl α-(N-methyl-N′-piperazine)-α-(3, 4-dibenzyloxybenzyl)malonate in the form of a light yellow oil.

*Analysis.*—Calcd. for $C_{33}H_{40}N_2O_8$ (percent): C, 70.69; H, 7.19; N, 4.99. Found (percent): C, 70.14; H, 6.90; N, 4.83.

EXAMPLE 11

α-(N-methyl-N′-piperazine)-β-(3-,4-dibenzyloxyphenyl)-propionic acid

To 100 ml. ethanol and 8.0 g. (0.2 mole) sodium hydroxide is added 35.0 g. ,0.0625 mole) of diethyl α-(N-methyl - N′ - piperazine) - α-(3-,4-dibenzyloxybenzyl)-malonate. The system is refluxed for 2 hours, cooled and adjusted to pH 7 with 10% HCl. The solvents are removed in vacuo and the residue crystallized from toluene to give α-(N-methyl-N′-piperazine)-β-(3,4 - dibenzyloxyphenyl)-propionic acid; M.P. 180–186°.

*Analysis.*—Calcd. for $C_{28}H_{32}N_2O_4$ (percent): C, 73.02; H, 7.00; N, 6.08. Found (percent): C, 72.32; H, 6.92; N, 5.71.

EXAMPLE 12

α-(N-methyl-N′-piperazine)-β-(3,4-dihydroxyphenyl)-propionic acid monohydrate

To 200 ml. ethanol acidified with 25 ml. 5% HCl is added 7.0 g. (15.2 moles) α-(N-methyl-N′-piperazine)-β-(3,4-dibenzyloxyphenyl)-propionic acid and 1.0 g. 10% palladium-charcoal. The mixture is shaken with hydrogen (40 p.s.i.) for 4 hours, filtered and ethanol distilled. Water (100 ml.) is added to the residue and the system adjusted to pH 7 with 10% sodium hydroxide. Upon cooling α-(N-methyl-N′-piperazine)-β-(3,4-dihydroxyphenyl)-propionic acid monohydrate in the form of a white solid crystallizes; M.P. 182–183°.

*Analysis.*—Calcd. for $C_{14}H_{22}N_2O_5$ (percent): C, 56.36; H, 7.43; N, 9.39. Found (percent): C, 56.40; H, 7.15; N, 9.15.

EXAMPLE 13

Diethyl α-chloro-α-(p-benzyloxybenzyl)malonate

To 150 ml. dry toluene is added 2.0 g. (0.048 mole) sodium hydride and 4.2 g. (0.02 mole) diethyl chloromalonate. The mixture is stirred at room temperature for ½ hour after which 5.0 g. (0.02 mole) p-benzyloxybenzyl chloride is added as a dry powder. The mixture is stirred at room temperature for an additional 30 minutes followed by refluxing for 17 hours. The system is cooled and water added to destroy the excess sodium hydride. The oranic layer is separated from the aqueous and washed with water and dried. Removal of solvent gives an orange oil which is chromatographed over silica gel (chloroform:cyclohexane,7:1) to give a colorless oil which crystallized from petroleum ether; M.P. 53.5–54.5°.

*Analysis.*—Calcd. for $C_{21}H_{23}ClO_5$ (percent): C, 64.62; H, 5.92. Found (percent): C, 65.25; H, 6.08.

EXAMPLE 14

Diethyl α-morpholino-α-(3,4-dihydroxybenzyl)malonate

To 200 ml. ethyl acetate is added 4.6 g. (0.0084 mole) diethyl α-morpholine-α-(3,4-dibenzyloxybenzyl)malonate and 2.0 g. 10% palladium-carbon. The mixture is shaken for 8 hours with H₂ at 40 p.s.i. after which it is filtered and the solvent evaporated. Chromatography of the resultant oil over silica gel (chloroform:ethanol, 40:1) provides a colorless solid which after crystallization (benzene) gives diethyl α - morpholino - α - (3,4-dihydroxybenzyl)malonate in the form of colorless crystals; M.P. 147–148°.

*Analysis.*—Calcd. for $C_{18}H_{25}NO_7$ (percent): C, 58.85; H, 6.86; N, 3.81. Found (percent): C, 59.40; H, 6.71; N, 3.74.

EXAMPLE 15

N-methyl-N′-piperazine malonic acid ethyl ester

To 300 ml. ethanol is added 100 g. (1.2 moles) sodium bicarbonate and 40.0 g. (0.16 mole) diethyl bromomalonate. To this stirred mixture is added dropwise over a period of ½ hour 33.4 g. (0.33 mole) N-methylpiperazine. The mixture is stirred and heated to reflux overnight, after which the system is cooled, filtered and the solvent evaporated. The residue is suspended in ethyl acetate and made basic with 10% sodium hydroxide and washed with water and dried. Removal of solvent affords an oil which is distilled to give N-methyl-N'-piperazine malonic acid ethyl ester in the form of a colorless oil; B.P. 125°/1.2 mm. Hg.

*Analysis.*—Calcd. for $C_{12}H_{22}N_2O_4$ (percent): C, 55.79; H, 8.58; N, 10.85. Found (percent): C, 55.94; H, 8.25; N, 10.67.

EXAMPLE 16

Diethyl morpholinomalonate

To 200 ml. benzene is added 20.0 g. (0.084 mole) diethyl bromomalonate followed by the slow addition of 19.2 g. (0.168 mole) morpholine. The mixture is stirred and heated to reflux for 1 hour after which it is cooled and filtered. Benzene is evaporated from the filtrate and the residue distilled to give diethyl morpholinomalonate in the form of a colorless oil; B.P. 121°/1.0 mm. Hg.

*Analysis.*—Calcd. for $C_{11}H_{19}NO_5$ (percent): C, 53.87; H, 7.81; N, 5.71. Found (percent): C, 53.95; H, 8.14; N, 5.65.

EXAMPLE 17

Diethyl α,α-dimorpholinomalonate

On standing the concentrated filtrate from Example 16 partially crystallizes. This is collected on the filter and recrystallized from petroleum ether to give diethyl α,α-dimorpholinomalonate in the form of colorless crystals; M.P. 128–129°.

*Analysis.*—Calcd. for $C_{15}H_{26}N_2O_6$ (percent): C, 54.53; H, 7.93; N, 8.47. Found (percent): C, 54.62; H, 7.64; N, 8.35.

EXAMPLE 18

Ethyl morpholinoacetate

To 400 ml. benzene is added 100 g. (1.3 moles) morpholine followed by the dropwise addition of 100 g. (0.6 mole) ethyl bromoacetate. The mixture is refluxed for 30 minutes, cooled, filtered and the solvent evaporated. The liquid residue is distilled and the fraction boiling at 228°/760 mm. is collected to give ethyl morpholinoacetate in the form of a colorless liquid.

*Analysis.*—Calcd. for $C_8H_{15}NO_3$ (percent): N, 8.08. Found (percent): N, 8.12.

EXAMPLE 19

N-methyl-N'-piperazineacetic acid ethyl ester

To 600 ml. ethanol is added 100 g. (0.6 mole) ethylbromoacetate, and 100 g. (1.2 moles) sodium bicarbonate. To this stirred mixture is slowly added 120 g. (1.2 moles) N-methylpiperazine and the mixture stirred at reflux for 16 hours. The excess ethanol is removed and the residue dissolved in chloroform and washed with brine, dried and distilled. The fraction boiling at 58°/0.3 mm. Hg is collected to give N-methyl - N' - piperazineacetic acid ethyl ester in the form of a colorless oil.

*Analysis.*—Calcd. for $C_8H_{18}N_2O_2$ (percent): N, 15.04. Found (percent): N, 15.12.

EXAMPLE 20

Ethyl pyrrolidineacetate

The procedure of Example 18 is repeated using pyrrolidine in place of morpholine to give ethyl pyrrolidineacetate in the form of a colorless oil: B.P. 37°/0.4 mm. Hg.

*Analysis.*—Calcd. for $C_8H_{15}NO_2$ (percent): N, 8.91 Found (percent): N, 8.91.

I claim:

1. A compound selected from compounds and pharmaceutically acceptable salts of compounds having the formula

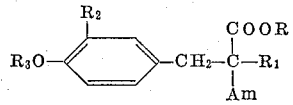

in which R is selected from hydrogen and lower alkyl of 1 to 4 carbon atoms, $R_1$ is selected from hydrogen and COOR, $R_2$ is selected from hydrogen, hydroxy, lower alkoxy, benzyloxy and phenylethoxy, $R_3$ is selected from hydrogen, lower alkyl of 1 to 4 carbon atoms, benzyl, phenethyl, phenylisopropyl and phenylbutyl and Am is morpholino provided, however, that $R_2$ and $R_3$ cannot both be hydrogen.

2. A compoud of claim 1 in which $R_2$ is benzyloxy and $R_3$ is benzyl.

3. A compound of claim 1 in which $R_2$ is hydroxy and $R_3$ is hydrogen.

4. A compound of claim 1 in which R is ethyl, $R_2$ is benzyloxy and $R_3$ is benzyl.

5. A compound of claim 1 in which $R_2$ is hydrogen and $R_3$ is benzyl.

References Cited

UNITED STATES PATENTS 2,527,574   10/1950   Rieveschl _____ 260—247.2

OTHER REFERENCES

Wagner et al.: Synthetic Organic Chemistry, N.Y. Wiley & Sons, 1953 (pp. 667–678 relied on).

ALEX MAZEL, Primary Examiner

A. M. T. TIGHE, Assistant Examiner

U.S. Cl. X.R.

260—268, 326.3, 394.3; 424—248, 250, 267, 274